(12) United States Patent
Hemmert et al.

(10) Patent No.: US 7,646,912 B2
(45) Date of Patent: Jan. 12, 2010

(54) METHOD AND DEVICE FOR ASCERTAINING FEATURE VECTORS FROM A SIGNAL

(75) Inventors: Werner Hemmert, Moosburg (DE); Marcus Holmberg, Varnamo (SE)

(73) Assignee: Infineon Technologies AG, Neubiberg (DE)

( * ) Notice: Subject to any disclaimer, the term of this patent is extended or adjusted under 35 U.S.C. 154(b) by 870 days.

(21) Appl. No.: 11/061,108

(22) Filed: Feb. 18, 2005

(65) Prior Publication Data

US 2005/0232496 A1    Oct. 20, 2005

(30) Foreign Application Priority Data

Feb. 19, 2004    (DE)    ............ 10 2004 008 225

(51) Int. Cl.
*G06K 9/00*    (2006.01)

(52) U.S. Cl. ............... 382/181; 382/224; 382/263; 382/275; 704/226; 704/230; 704/233; 704/234

(58) Field of Classification Search ............ 370/208, 370/210; 382/181, 224, 260, 261, 263, 197; 704/219, 226, 230, 233, 234, 255; 706/52
See application file for complete search history.

(56) References Cited

U.S. PATENT DOCUMENTS

| 4,935,748 | A | * | 6/1990 | Schmidt et al. ............ 346/33 C |
| 5,046,504 | A | * | 9/1991 | Albert et al. ............... 600/509 |
| 5,150,413 | A | | 9/1992 | Nakatani et al. |
| 5,778,156 | A | * | 7/1998 | Schweid et al. ............ 706/52 |
| 6,522,266 | B1 | * | 2/2003 | Soehren et al. ............ 340/988 |
| 6,616,611 | B1 | * | 9/2003 | Moehring ............... 600/454 |
| 7,035,797 | B2 | * | 4/2006 | Iso-Sipila ............... 704/227 |
| 7,091,779 | B2 | * | 8/2006 | Sahlman .................. 330/149 |
| 7,107,210 | B2 | * | 9/2006 | Deng et al. .............. 704/226 |
| 7,128,713 | B2 | * | 10/2006 | Moehring et al. .......... 600/453 |
| 7,174,044 | B2 | * | 2/2007 | Ding et al. ............... 382/210 |
| 7,245,315 | B2 | * | 7/2007 | Sadok et al. ............. 348/165 |
| 7,389,230 | B1 | * | 6/2008 | Nelken .................... 704/255 |
| 7,460,613 | B2 | * | 12/2008 | Sahlman .................. 375/296 |
| 2002/0031268 | A1 | * | 3/2002 | Prabhakar et al. ......... 382/224 |
| 2002/0042712 | A1 | * | 4/2002 | Yajima et al. ............. 704/260 |
| 2003/0039205 | A1 | * | 2/2003 | Chiodini ................. 370/210 |
| 2003/0225577 | A1 | * | 12/2003 | Deng et al. .............. 704/226 |
| 2004/0257157 | A1 | * | 12/2004 | Sahlman .................. 330/149 |
| 2005/0228652 | A1 | * | 10/2005 | Ehara et al. .............. 704/219 |
| 2006/0074667 | A1 | * | 4/2006 | Saffer ..................... 704/257 |
| 2008/0114564 | A1 | * | 5/2008 | Ihara ..................... 702/158 |

FOREIGN PATENT DOCUMENTS

EP    0508547    10/1992

OTHER PUBLICATIONS

A. Adami et al., Qualcomm-ICSI-OGI Features for ASR, ICSLP-2002, Denver, Colorado, USA, Sep. 2002.
H. Hermansky et al., RASTA-PLP Speech Analysis, International Computer Science Institute Technical Report (ICSI TR) 91-069, Berkeley, California, Dec. 1991, pp. 1-6.
H.G. Hirsch and D. Pearce, The AURORA experimental framework for the performance evaluation of speech recognition systems under noisy conditions, ISCA IPRW ASR 2000, Automatic Speech recognition: Challenges for the next millennium, Paris, Frankreich, 18.-20. Sep. 2000.

* cited by examiner

*Primary Examiner*—Gregory M Desire
(74) *Attorney, Agent, or Firm*—Dicke, Billig & Czaja, PLLC

(57) ABSTRACT

A signal is used to form intermediate feature vectors which are subjected to high-pass filtering. The high-pass-filtered intermediate feature vectors have a respective prescribed addition feature vector added to them.

6 Claims, 2 Drawing Sheets

METHOD AND DEVICE FOR ASCERTAINING FEATURE VECTORS FROM A SIGNAL

CROSS REFERENCE TO RELATED APPLICATION

This Utility Patent Application claims the benefit of the filing date of Application Number DE 10 2004 008 225.142, filed Feb. 19, 2004, of which is herein incorporated by reference.

FIELD OF THE INVENTION

The invention relates to a method and a device for ascertaining feature vectors from a signal for pattern recognition, to a method and a device for pattern recognition and to computer-readable storage media.

BACKGROUND

In an ordinary voice recognition system, Fast Fourier Transformation (FFT) is used on an analog/digital-converted input signal for the purpose of spectral analysis of the input signal. One considerable problem within the context of voice recognition, generally within the context of pattern recognition, is the suppression of interference noise, expressed another way the suppression of noise signals. The interference noise causes the recognition rate to fall drastically even at relatively low levels of existing interference signals.

To suppress interference noise, it is known practice in A. Adami et al., Qualcomm-ICSI-OGI Features for ASR, ICSLP-2002, Denver, Colo., USA, September 2002 to use a Wiener filter as an adaptive filter in order to increase the signal-to-noise ratio during signal analysis.

A drawback of the use of a Wiener filter, generally of an adaptive filter, within the context of interference noise suppression can be seen, in particular, in the very great computation complexity for forming the filter algorithm and in the need for periodically repeated calculation of the filter coefficients.

H. Hermansky et al., RASTA-PLP Speech Analysis, International Computer Science Institute Technical Report (ICSI TR) 91-069, Berkeley, Calif., December 1991 also describes a method for voice recognition in which an analog/digital-converted signal is used to form intermediate feature vectors which are subjected to bandpass filtering.

The method described in H. Hermansky et al., RASTA-PLP Speech Analysis, International Computer Science Institute Technical Report (ICSI TR) 91-069, Berkeley, Calif., December 1991 has, in particular, the drawback of a still relatively poor recognition power within the context of voice recognition for a voice signal which is affected by an interference signal.

In addition, H.-G. Hirsch and D. Pearce, The AURORA experimental framework for the performance evaluation of speech recognition systems under noisy conditions, ISCA IPRW ASR 2000, Automatic speech recognition: Challenges for the next millennium, Paris, France, 18-20 Sep. 2000 describes the "AURORA" experimental framework for ascertaining the performance of a voice recognition system in an environment with interference signals.

DE 35 10 660 C2 describes a method and a device for processing a voice signal in which the voice signal is subjected to frequency analysis, the frequency distribution pattern (obtained in the result of the frequency analysis on the voice signal) in a particular frequency range over which the voice signal extends being repeated alternately along a time axis in order to form a periodic waveform which is subjected to high-pass filtering, which extracts the relatively quickly changing components.

In addition, DE 41 11 995 A1 discloses the practice of logarithmizing feature vectors during Fast-Fourier-Transformation-based spectral analysis prior to the convolution. DE 41 11 995 A1 also discloses the practice of performing intensity normalization of the spectral feature vectors prior to recursive high-pass filtering which is applied to the voice signal.

A. Adami et al., "Qualcomm-ICSI-OGI features for ASR," in Proc. International Conference on Spoken Language Processing (ICSLP'02). An archive with an additional description of the Wiener filter with associated software can be obtained at the following URL address:

http://www.icsi.berkeley.edu/Speech/papers/gelbart-ms/ pointers discloses a Wiener filter.

There is a need for providing pattern recognition which has an improved recognition rate over the method described in H. Hermansky et al., RASTA-PLP Speech Analysis, International Computer Science Institute Technical Report (ICSI TR) 91-069, Berkeley, Calif., December 1991 and requires less computation complexity than the method described in A. Adami et al., Qualcomm-ICSI-OGI Features for ASR, ICSLP-2002, Denver, Colo., USA, September 2002.

SUMMARY

The present invention provides a method and a device for ascertaining feature vectors from a digitized signal for pattern recognition, a method and a device for pattern recognition and a computer-readable storage media having instructions for implementing a method according to the invention.

In one embodiment, in a method for the computer-aided ascertainment of feature vectors from a digitized signal for pattern recognition, the digitized signal is used to form intermediate feature vectors, at least some of whose components have a power spectrum, preferably a transient power spectrum, from part of the digitized signal. The intermediate feature vectors are subjected to high-pass filtering. In addition, at least some of the high-pass-filtered intermediate feature vectors have a respective prescribed addition feature vector added to them, so that the feature vectors are formed.

A method for computer-aided pattern recognition has the above-described method for ascertaining the feature vectors, with the sum of the high-pass-filtered intermediate feature vectors and the addition feature vectors being used as feature vectors to perform pattern recognition.

A device for ascertaining feature vectors from a digitized signal for pattern recognition has a unit for forming intermediate feature vectors from the digitized signal, at least some of the components of the intermediate feature vectors having a power spectrum, preferably a transient power spectrum, from part of the digitized signal. In addition, a high-pass filter, which is coupled to the unit for forming intermediate feature vectors, is provided for high-pass filtering the intermediate feature vectors. There is also a signal addition unit which is set up to add a respective prescribed addition feature vector at least to some of the high-pass-filtered intermediate feature vectors.

The invention is used to suppress interference signals during feature extraction, i.e., during the formation of feature vectors from a digitized signal, for a pattern recognition system, particularly for an automatic voice recognition system. Within the context of the suppression of interference signals, interference signal components which remain constant, i.e.

are essentially unchanged, over time are partly subtracted, and components of the voice signal which vary over time are emphasized, i.e. amplified.

By providing a novel type of filter within the context of pattern recognition in order to filter the intermediate feature vectors, namely high-pass filtering of the intermediate feature vectors and addition of an additional addition signal, namely the addition feature vectors, to at least some of the high-pass-filtered intermediate feature vectors, the invention very efficiently and simply simulates fundamental properties of the human hearing, particularly adaptation, in technical feature extraction for an automatic pattern recognition system, particularly for a voice recognition system.

The invention achieves a significantly improved recognition rate over the RASTA method, which is described in H. Hermansky et al., RASTA-PLP Speech Analysis, International Computer Science Institute Technical Report (ICSI TR) 91-069, Berkeley, Calif., December 1991, within the context of pattern recognition for a signal which is affected by an interference signal.

The invention is also distinguished by a significantly reduced need for computation complexity for suppressing interference noise, compared with the Wiener filter described in A. Adami et al., Qualcomm-ICSI-OGI Features for ASR, ICSLP-2002, Denver, Colo., USA, September 2002.

Preferred developments of the invention can be found in the dependent claims.

The refinements of the invention which are described below apply to the method for ascertaining feature vectors, to the method for pattern recognition, to the device for ascertaining feature vectors, to the device for pattern recognition and to the computer-readable storage media.

In line with one refinement of the invention, the high-pass filtering is performed using a nonadaptive high-pass filter. In principle, it is possible to use any suitable high-pass filter of any order, but preferably a first-order high-pass filter is used, particularly preferably a first-order nonadaptive high-pass filter. The cut-off frequency of the high-pass filter used is preferably between 0.1 Hz and 100 Hz, particularly preferably between 0.5 Hz and 100 Hz, particularly 0.5 Hz-2 Hz.

In another refinement of the invention, provision is made for the use of an adaptive high-pass filter of any order, for example likewise of the first order, with the above-described cut-off frequencies for the nonadaptive filter, the filter preferably being in the form of a wave digital filter.

Since the high-pass filter requires a certain transient time, "turn-on artifacts" arise which are eliminated. To this end, the feature vectors are calculated without high-pass filtering for the initial period, e.g. the first 100 ms of the signal. This value is used to preload the high-pass filter, with the effect that the transient artifacts are eliminated.

In line with another refinement of the invention, the addition feature vectors used are the intermediate feature vectors themselves, preferably multiplied by a prescribed weighting factor. The weighting factor preferably has a value of between 0.1 and 3, particularly a value of between 0.5 and 1.5, particularly the value 0.9.

This refinement of the invention describes a very simple algorithm for forming the feature vectors which are actually used for pattern recognition, without the need to perform complex adaptation of a digital filter, in the course of which the respective filter coefficients need to be continuously reascertained.

Particularly the value of a cut-off frequency of the high-pass filter, also called the corner frequency of the high-pass filter, of 0.5 Hz demonstrated the highest level of stability within the context of the AURORA test scenario described in H.-G. Hirsch and D. Pearce, The AURORA experimental framework for the performance evaluation of speech recognition systems under noisy conditions, ISCA IPRW ASR 2000, Automatic speech recognition: Challenges for the next millennium, Paris, France, 18-20 Sep. 2000, and particularly when selecting the weighting factor of 0.9 the best recognition powers.

The invention is particularly suitable for use in automatic voice recognition or automatic speaker recognition, but may alternatively also be used within the context of digital image processing, particularly within the context of image recognition. The invention may also be used advantageously in the field of (digital) hearing aids or (digital) hearing devices for patients with inner-ear-related deafness, for example in a cochlea implant.

In general, the invention may be used in any field of pattern recognition in which it is necessary to emphasize the change in a signal over time in the time domain and to suppress the signals which remain essentially constant over time in the time domain incompletely.

In line with another refinement of the invention, provision is made for the high-pass filtering to include multistage high-pass filtering, i.e., there are a plurality of series-connected high-pass filters, preferably with different cut-off frequencies. Furthermore, there may additionally also be one or more low-pass filters. The structure of the plurality of high-pass filters and/or low-pass filters results in even further improved simulation of the properties of the human hearing, particularly the simulation of the adaptation of the auditory nerves in the logarithmized energy domain. The arrangement and number of high-pass filters and low-pass filters used depends particularly on the desired degree of exactness for the simulation of the properties of the human hearing or is limited by the finite data volume for training and testing the voice recognition system.

In addition, there may be a Wiener filter for providing the digitized signal or for preprocessing the digitized signal or for processing a spectral-transformed digitized signal, for example the signal which has been subjected to Fast Fourier Transformation.

In summary, aspects of the invention may be seen in the following principles:

a) Simulation of the adaptation of the auditory nerves in the logarithmized energy domain;

b) High-pass filtering of the intermediate feature vectors averaged in the time domain, i.e., of the features averaged in the time domain;

c) Addition of the original unchanged signal, i.e. the intermediate feature vectors, to the high-pass-filtered signal, namely the high-pass-filtered intermediate feature vectors; and d) Optimization of the model parameters for maximum improvement of the robustness of automatic voice recognition systems.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description.

The elements of the drawings are not necessarily to scale relative to each other. Like reference numerals designate corresponding similar parts.

BRIEF DESCRIPTION

Figure 1:
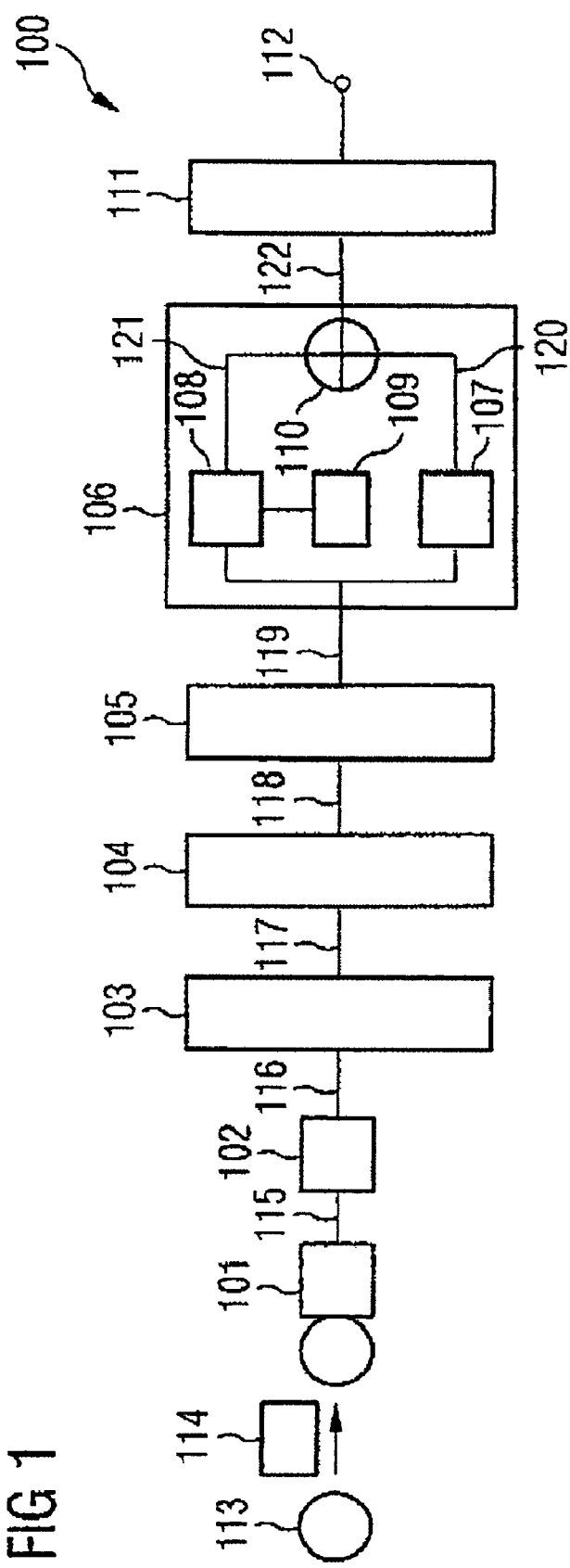
FIG. 1 illustrates a voice recognition system based on an exemplary embodiment of the invention.

FIG. 1 illustrates a voice recognition system 100 which can be produced using analog or digital technology. A microphone 101 is coupled to an analog/digital converter (analog technology: input filter) 102, whose output is coupled to a Fast Fourier Transformation unit (or a filter bank) 103. The Fast Fourier Transformation unit/filter bank 103 is used to perform frequency analysis on the signal, as explained in more detail below.

Coupled to the output of the Fast Fourier Transformation unit 103 is a unit 104 for forming Mel-scaled amplitude coefficients, or alternatively the channels of the analog filter bank may already be Mel-scaled. In the case of an embodiment using analog technology, the filter outputs are rectified and low-pass filtered (the corner frequency of a low-pass filter used is preferably in a range between 1 Hz and 3 kHz, preferably 1 kHz). In addition, there is a logarithmizing unit 105. This may additionally contain a unit for forming Mel-scaled cepstrum coefficients. A filter unit 106 coupled to the output of the unit 105 has a high-pass filter 107, set up (in this exemplary embodiment) as an analog filter or as a digital first-order nonadaptive high-pass filter with a corner frequency of 0.5 Hz. In addition, there is a weighting unit 108 for multiplying the input signal applied to the weighting unit 108 by a prescribed weighting factor 109, so that the output signal obtained from the weighting unit 108 is the input signal multiplied by the weighting factor 109.

The input of both the weighting unit 108 and the high-pass filter 107 is coupled to the output of the logarithmizing unit 105. The output of the weighting unit 108 and of the high-pass filter 107 is coupled to a first input or to a second input of an adder 110. The adder 110 forms the sum of the output signals from the high-pass filter 107 and from the weighting unit 108.

The output of the adder 110 is coupled to a voice recognition unit 111 which is set up for speaker-independent voice recognition and which has a multiplicity of Hidden Markov Models.

The voice recognition unit 111, which is fundamentally set up on the basis of an arbitrary voice recognition algorithm, for example using the dynamic programming method or similar methods, is used to perform automatic voice recognition for the signal which is input into the voice recognition unit 111 using previously stored training data.

The result of the voice recognition is a voice recognition result signal 112, which is stored, for example as a code book entry during vector quantization, or is transmitted to a receiver, for example using a radiocommunication link or a landline communication link, or represents a result signal which represents a prescribed command for an action which is to be executed, depending on the result of the voice recognition.

The text below gives a more detailed description of the way in which the individual components of the voice recognition system 100 which are described above work.

A speaker 113 speaks a voice signal 114, which contains a useful voice signal component and a noise signal component, into the microphone 101, from where it is supplied to the analog/digital converter 102 in the form of an electronic analog signal 115.

The analog signal 115 is sampled by means of the analog/digital converter 102 (which is set up as an antialiasing filter in order to meet the "sampling theorem"). To convert the analog voice signal 115 from the time domain into the frequency domain, the voice signal 115 is weighted using an analysis window. The analysis window, set up (in this exemplary embodiment) as a "Hamming window" which has a window length of 25 ms, is moved over the analog voice signal 115 using a firmly prescribed step size, in this exemplary embodiment 10 ms.

As an alternative to the Hamming window, it is possible to use any suitable window with any suitable window function, for example a rectangular window function.

The analog/digital-converted voice signal data 116 respectively associated with a Hamming window by means of the Hamming window function are supplied to the Fast Fourier Transformation unit 103, where the components of prescribed frequency ranges, also called frequency bands, are ascertained, in this exemplary embodiment respective coefficients for a frequency band of 40 Hz in a range between 0 Hz and 4 kHz, so that the Fast Fourier Transformation unit 103 provides Fast Fourier Transformation coefficients 117 and supplies them to the unit 104 for forming the Mel-scaled amplitude spectrum or Mel-scaled cepstrum coefficients.

In this exemplary embodiment of the invention, twelve Mel-scaled cepstrum coefficients 118 are formed by the unit 104 for forming Mel-scaled cepstrum coefficients and are supplied to the logarithmizing unit 105, in which the Mel-scaled coefficients 118 are logarithmized.

The output of the logarithmizing unit 105 thus provides respective intermediate feature vectors 119, i.e., the logarithmized coefficients 119 (one intermediate feature vector per analysis window), which indicate the logarithmized energy content and hence clearly a transient power spectrum or the cepstral coefficients thereof.

Alternatively or in addition, the intermediate feature vector 119 may also contain differential values (i.e., the first time derivative) which describe differences between the respective coefficients of intermediate feature vectors 119 with adjacent timing, or alternatively or additionally also the differences between the differential values (i.e. the second time derivative) of the coefficients of two successive intermediate feature vectors 119.

Instead of the logarithmization, it is also possible to form the cube root of the values of the respective vector components or the root of the squared amplitude values of the respective vector components. Alternatively, instead of the Fast Fourier Transformation unit 103, the unit 104 for forming Mel-scaled cepstrum coefficients and the logarithmizing unit 105, there may be another model which depicts the response or properties of the inner ear, i.e. any suitable other inner ear model.

The cepstrum coefficients 119 are supplied to the high-pass filter 107, where they are subjected to high-pass filtering, so that signal components which are essentially constant, i.e. remain the same, over time are removed using the high-pass filter 107.

To suppress "onset artifacts", the high-pass filter is preloaded with the value from the first feature vector or the mean of the initial period, e.g. the first 100 ms of the signal.

The output of the high-pass filter 107 thus provides the high-pass-filtered logarithmized coefficients 120 and supplies them to the first input of the adder 110.

In addition, the logarithmized coefficients, i.e. the intermediate feature vector 119, are supplied to the weighting unit 108, where they are multiplied by the weighting factor 109, in this exemplary embodiment by the weighting factor 109 with the value 0.9, and the multiplied intermediate feature vector 121, i.e. the weighted logarithmized coefficients 119, are supplied to the second input of the adder 110.

The high-pass-filtered logarithmized coefficients 120 and the weighted logarithmized coefficients 121 are added, so that for a respective time window the output of the adder 110 provides the sum of the above-described coefficients as a feature vector 122 which is to be used within the context of the voice recognition.

The feature vector 122 is supplied to the voice recognition unit 111, where it is used for voice recognition in a manner which is known per se.

The feature vector used for voice recognition is thus formed for a respective time window by summing the high-pass-filtered spectrum with the spectrum weighted using a weighting factor W 109.

The text below compares the results of the above-described feature extraction, expressed another way the above-described method for ascertaining the feature vectors, with the results of the method for feature extraction based on the RASTA method, as described in H. Hermansky et al., RASTA-PLP Speech Analysis, International Computer Science Institute Technical Report (ICSI TR) 91-069, Berkeley, Calif., December 1991.

Figure 2:
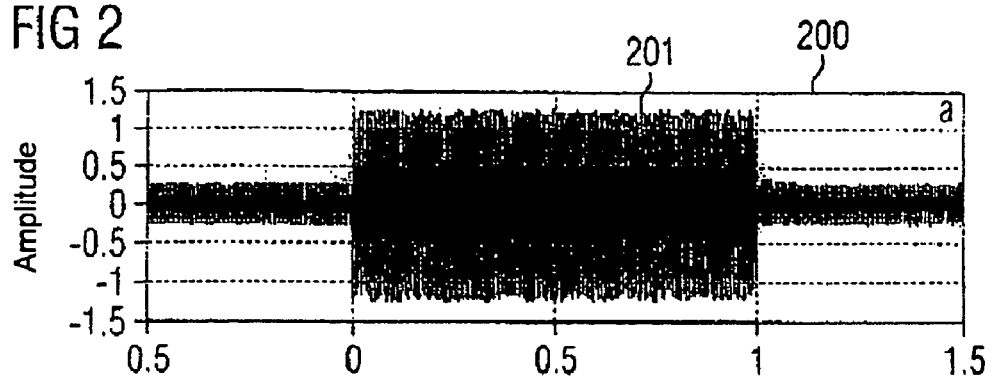
FIG. 2 illustrates a signal profile for a 1 kHz burst of sound with additive white noise.

FIG. 2 illustrates a 1 kHz burst of sound with additive white noise 201 in an amplitude profile graph 200, in which the respective frequency amplitude is shown as a function of frequency.

Figure 3:
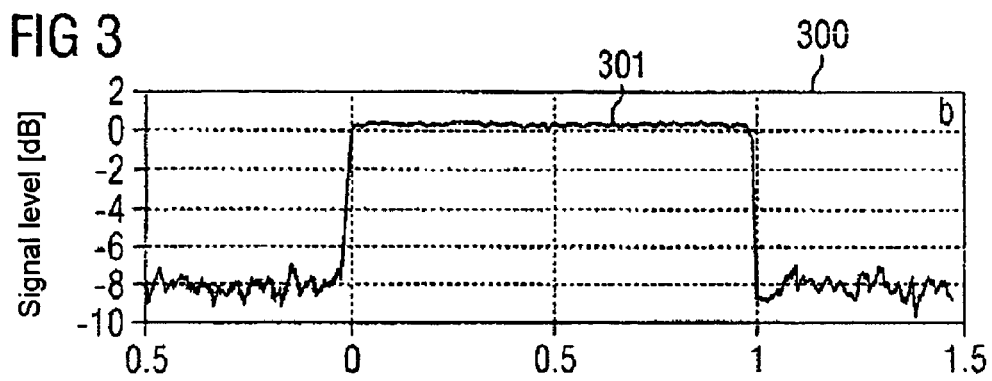
FIG. 3 illustrates a signal in the 1 kHz frequency channel from FIG. 2 following the performance of Fast-Fourier-Transformation-based MEL spectral analysis.

FIG. 3 uses a graph 300 to show the Mel spectrum 300 associated with the signal profile from FIG. 2, i.e. the burst of sound 201 with the overlaid white noise signal is processed further in the logarithmized spectral range.

Figure 4:
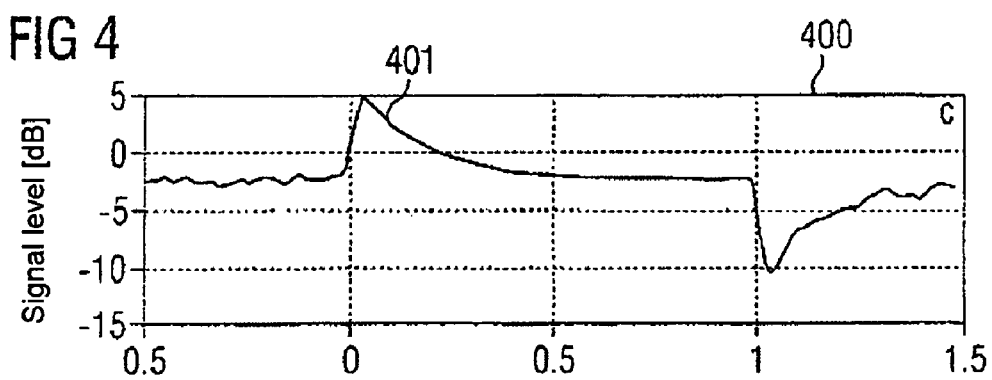
FIG. 4 illustrates the signal from FIG. 3 following the performance of RASTA filtering.

The RASTA filtering from H. Hermansky et al., RASTA-PLP Speech Analysis, International Computer Science Institute Technical Report (ICSI TR) 91-069, Berkeley, Calif., December 1991 comprises high-pass filtering and low-pass filtering. Within the context of the high-pass filtering, all constant signal components are removed according to the high-pass-filter-specific time constant, and only the corresponding higher-frequency signal changes remain visible. The low-pass filtering provided in H. Hermansky et al., RASTA-PLP Speech Analysis, International Computer Science Institute Technical Report (ICSI TR) 91-069, Berkeley, Calif., December 1991 smoothes the signal. The result of the RASTA filtering is shown in a graph 400 in the RASTA spectrum signal 401 in FIG. 4.

In the inventive adaptation filter, the original spectrum and the high-pass-filtered spectrum are added. Steady noise components, but also signal components, are compensated for only in part. The noise signal provides an almost constant signal contribution, and the onset of the useful signal (of the burst of sound) is emphasized.

Figure 5:
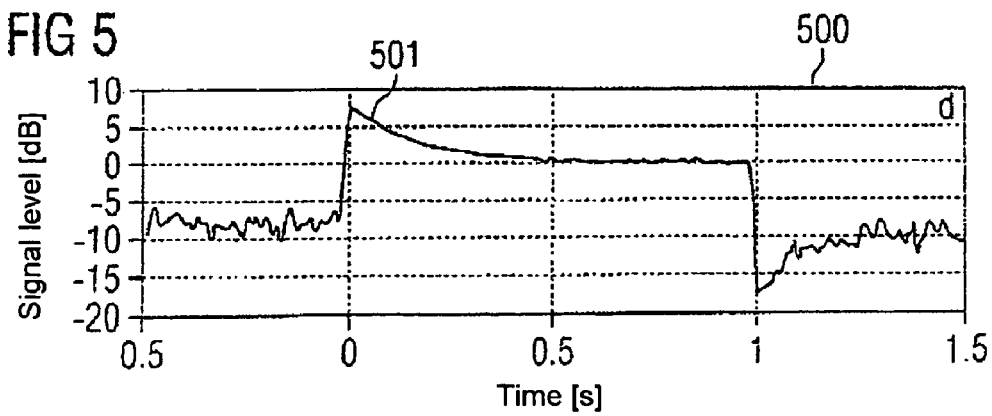
FIG. 5 illustrates the signal from FIG. 2 following the performance of filtering based on the exemplary embodiment of the invention.

This is illustrated in FIG. 5 in a further graph 500 using the signal profile 501, which represents interference signal suppression inspired physiologically in line with the invention.

At the same time, for the duration of the sound, a constant signal component is maintained which is not lost completely, in contrast to the RASTA method described in H. Hermansky et al., RASTA-PLP Speech Analysis, International Computer Science Institute Technical Report (ICSI TR) 91-069, Berkeley, Calif., December 1991.

Put another way, this means that the signal does not return to the value zero in the case of a longer sound, but rather to the prescribed DC component, for example to the weighted signal component which the feature vector respectively describes itself.

It has been found that the inventive physiologically oriented implementation qualitatively simulates the firing probability of the aural nerves in the human hearing, which significantly increases the quality of the subsequent voice recognition process.

The invention converts the properties of the hearing and the coding of the signals into nerve action potentials and simulates them qualitatively.

The invention can clearly be regarded as being similar to a proportional/differential controller (PD controller), since the invention involves the use not only of the high-pass-filtered signal from the feature vectors but also the high-pass-filtered coefficients from the feature vectors and also the coefficients from the feature vectors themselves and hence the first time derivative of the incoming signal and, additively, the DC component of the temporal signal.

The filtering is used for continuously estimating the intermediate feature vector components using a time constant of approximately 300 ms and for subtracting them from the present components of the intermediate feature vector. This operation is equivalent, as described above, to high-pass filtering the feature vector components of the intermediate feature vector. At the same time, a feature component, i.e. a component of the respective intermediate feature vector, is added unchanged to the high-pass-filtered feature component. The result of this processing simulates the initially very high and then falling firing rate of the cochlea nerves or auditory neurons in the auditory system on a sound signal of constant intensity.

In line with another refinement of the invention, provision is made for the high-pass filter 107 to be in the form of an adaptive high-pass filter, generally of any order, preferably of first order.

For conventional digital filter implementations, the high-pass filter function may also be written and implemented in the form $$H(z) = \frac{2f_S\tau - 2f_S\tau \cdot z^{-1}}{1 + 2f_S\tau + (1 - 2f_S\tau)z^{-1}}.$$

In this case, $f_s=100$ Hz is the rate of the MFCC features and $\tau=1/(2\pi f_0)$ is a time constant of the high-pass filter.

In line with one preferred embodiment of the invention, the high-pass filter is in the form of a wave digital filter, expressed another way the high-pass filter based on this embodiment of the invention has been implemented using wave digital filter equations.

The cut-off frequency of the high-pass filter is denoted by $f_0$, the sampling frequency used to sample the analog voice signal is denoted by $f_s$ and the filter coefficient of the high-pass filter based on this exemplary embodiment of the invention is denoted by g.

In line with this exemplary embodiment of the invention, the filter coefficient g is obtained in line with the following rule:

$$g = \frac{1}{1 + \frac{f_s}{\pi \cdot f_0}}$$

The filter output Filt of the high-pass filter and the filter register Z used are updated recursively for every new input sample Input in line with the following rules:

b3=−(Input+Z);
b1=Input+2*g*b3;
b2=(2*Input+2*g*b3+Z);
Filt=−(b2+Z)/2;
Z=−b2;
Output=Filt+W*Input, where b1, b2, b3 denote variables which describe states of the wave digital filter ports. Within the context of these computation rules, they merely form auxiliary variables which are not explicitly needed for calculating the output. W denotes the weighting factor 109 used by the weighting unit 108. The weighting factor preferably has, as in the first exemplary embodiment of the invention, the value 0.9, particularly preferably the value 1.

Within the context of formation of the feature vector, the following rule is thus obtained for the proportional component P formed by the weighting unit 108:

$P = W^* \text{Input}.$

In line with another refinement of the invention, the cut-off frequency of the high-pass filter $f_0$ is 1 Hz and the weighting factor is the value 1.

The above-described embodiment with the adaptive high-pass filter was tested using the AURORA 2 test environment and was compared with the RASTA filtering.

Features based on Mel-scaled cepstrum coefficients (MFCC) were used, which are widespread within the context of automatic voice recognition. AURORA 2 is based on the recognition of numbers which are spoken by a large number of speakers, with artificial noise at different levels having been added in each case. Ten different noise environments were tested with signal-to-noise ratios of between −5 dB and 20 dB.

In addition, the "complex" back-end structure was used for this test, as is described in "http://icsip2002.colorado.edu/spezial\_sessions/aurora/".

The results illustrate that a relative improvement in the voice recognition was achieved, particularly in the word error rate, for example, the RASTA filtering having achieved a word error rate of 35.54%, which could be reduced to 23.45% by using the inventive adaptive high-pass filtering with the addition of the proportionally weighted respective intermediate feature vectors, corresponding to a relative improvement of 31%.

In another alternative embodiment of the invention, there is additionally a Wiener filter as well, which may be provided as an input filter upstream of the analog/digital conversion, for example, i.e. connected upstream of the analog/digital converter 102. The Wiener filter is in the form described in A. Adami et al., "Qualcomm-ICSI-OGI features for ASR," in Proc. International Conference on Spoken Language Processing (ICSLP'02). An archive with an additional description of the Wiener filter with associated software can be obtained at the following URL address:

http://www.icsi.berkeley.edu/Speech/papers/gelbart-ms/pointers, for example. In another alternative embodiment, the Wiener filter may also be connected between the Fast Fourier Transformation unit (or a filter bank) 103 and the unit 104 for forming Mel-scaled amplitude coefficients in order to provide Wiener filtering of the Fast-Fourier-Transformed coefficients.

The invention claimed is:

1. A device for the computer-aided ascertainment of feature vectors from a signal for voice recognition, comprising:
   a unit for forming intermediate feature vectors from the signal, at least some of the components of the intermediate feature vectors having a power spectrum from part of the digitized signal;
   a high-pass filter, which is coupled to the unit for forming intermediate feature vectors, for high-pass filtering the intermediate feature vectors;
   a weighting unit, which is coupled to the unit for forming intermediate feature vectors, for multiplying the intermediate feature vectors by a weighting factor; and
   a signal addition unit which is set up to add a respective prescribed addition feature vector at least to some of the high-pass-filtered intermediate feature vectors, the addition feature vectors used being the respective intermediate feature vectors multiplied by the weighting factor.

2. The device of claim 1, comprising:
   a Wiener filter for providing the digitized signal or for preprocessing the digitized signal or for processing a spectral-transformed digitized signal.

3. A device for computer-aided voice recognition, comprising:
   a unit configured for forming intermediate feature vectors from a signal, at least some of the components of the intermediate feature vectors having a power spectrum from part of the signal;
   a high-pass filter, which is coupled to the unit for forming intermediate feature vectors, for high-pass filtering the intermediate feature vectors;
   a weighting unit, which is coupled to the unit for forming intermediate feature vectors, for multiplying the intermediate feature vectors by a weighting factor;
   a signal addition unit which is set up to add a respective prescribed addition feature vector at least to some of the high-pass-filtered intermediate feature vectors, the addition feature vectors used being the respective intermediate feature vectors multiplied by the weighting factor; and
   a voice recognition unit for voice recognition using the sum formed as feature vectors.

4. A computer-readable storage medium having a computer program for ascertaining feature vectors from a signal for voice recognition which, when executed by a processor, comprises:
   using the signal to form intermediate feature vectors,
   subjecting the intermediate feature vectors to high-pass filtering; and multiplying the intermediate feature vectors by a weighting factor;

wherein at least some of the high-pass-filtered intermediate feature vectors have a respective prescribed addition feature vector added to them, the addition feature vectors used being the respective intermediate feature vectors multiplied by the weighting factor.

5. A computer-readable storage medium having a computer program for computer-aided voice recognition which, when executed by a processor, comprises:

using a signal to form intermediate feature vectors;

subjecting the intermediate feature vectors to high-pass filtering;

multiplying the intermediate feature vectors by a weighting factor;

wherein at least some of the high-pass-filtered intermediate feature vectors have a respective prescribed addition feature vector added to them, the addition feature vectors used being the respective intermediate feature vectors multiplied by the weighting factor; and using the sum formed as feature vectors to perform voice recognition.

6. A device for computer-aided voice recognition, comprising:

means for forming intermediate feature vectors from a signal, at least some of the components of the intermediate feature vectors having a power spectrum from part of the signal;

a high-pass filter, which is coupled to the means for forming intermediate feature vectors, for high-pass filtering the intermediate feature vectors;

a weighting unit, which is coupled to the means for forming intermediate feature vectors, for multiplying the intermediate feature vectors by a weighting factor;

a signal addition unit which is set up to add a respective prescribed addition feature vector at least to some of the high-pass-filtered intermediate feature vectors, the addition feature vectors used being the respective intermediate feature vectors multiplied by the weighting factor; and a voice recognition unit for voice recognition using the sum formed as feature vectors.

* * * * *